(No Model.)
H. H. BOGGS.
COOKING APPARATUS.
No. 401,480. Patented Apr. 16, 1889.
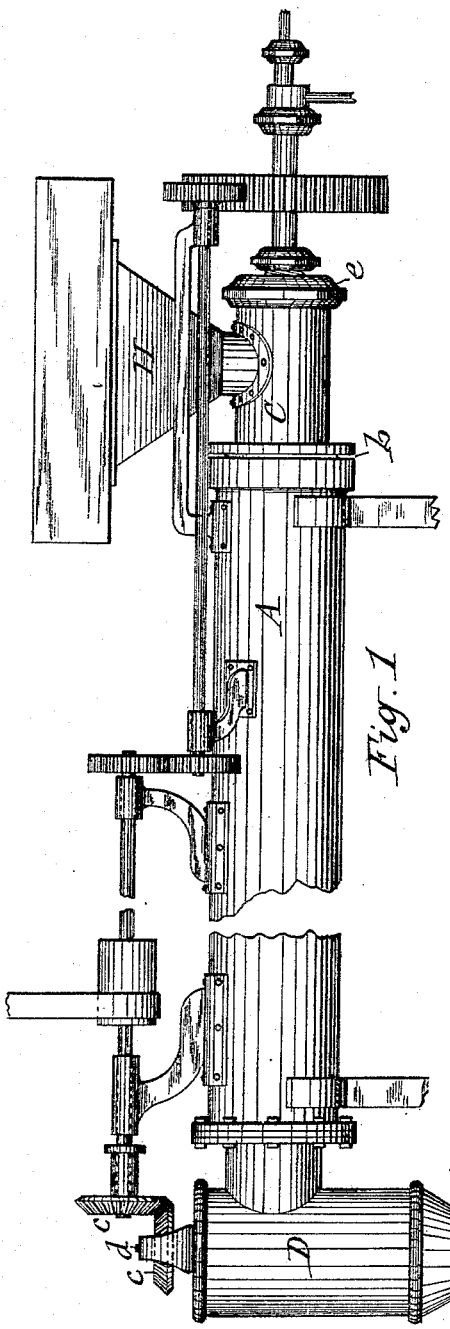
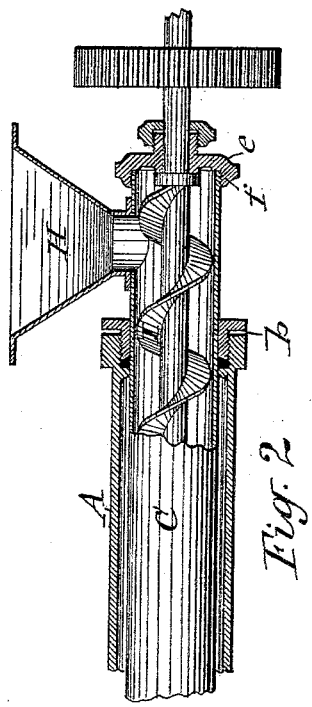
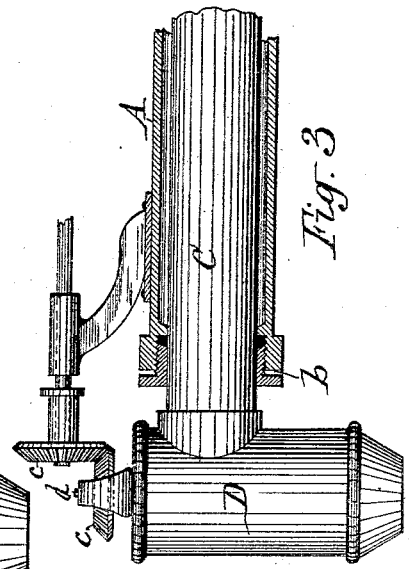
WITNESSES:
C. L. Bendicon
J. J. Laass
INVENTOR:
Henry H. Boggs
BY
Dudl, Laass & Dudl
ATTORNEYS.

UNITED STATES PATENT OFFICE.

HENRY H. BOGGS, OF SYRACUSE, NEW YORK, ASSIGNOR TO THE HEMINGWAY MANUFACTURING COMPANY, OF SAME PLACE.

COOKING APPARATUS.

SPECIFICATION forming part of Letters Patent No. 401,480, dated April 16, 1889.

Application filed March 31, 1888. Serial No. 269,153. (No model.)

*To all whom it may concern:*

Be it known that I, HENRY H. BOGGS, of Syracuse, in the county of Onondaga, in the State of New York, have invented new and useful Improvements in Cooking Apparatus, of which the following, taken in connection with the accompanying drawings, is a full, clear, and exact description.

This invention relates to the class of cooking apparatuses in which the substance to be cooked is forced longitudinally through a tube or cylinder arranged within a steam-cylinder or steam-jacket, the steam of which latter heats the inner cylinder, so as to cook therein the substance in transit. Hitherto such apparatuses have been constructed with the inner cylinder rigidly secured to the outer cylinder at both ends thereof. In the operation of said apparatus it is found that, owing to the more severe subjection to heat and consequent greater expansion of the inner cylinder than the outer cylinder, the rigid connections of said cylinders are subjected to undue strain, and frequently either the inner cylinder becomes buckled or the aforesaid connections are broken or the gearing disarranged to such an extent as to render the apparatus inoperative.

It is to obviate these defects which my present invention has for its object; and to that end my invention consists in providing the cylinders with a telescopic joint which allows the inner cylinder to freely expand and contract independent of the outer cylinder, as hereinafter more fully described, and specifically set forth in the claim.

In the annexed drawings, Figure 1 is a side elevation of the end portions of a cooking apparatus embodying my improvements. Fig. 2 is a vertical longitudinal section of the same, and Fig. 3 is a longitudinal section of my improvement applied to the discharge end of the apparatus.

Similar letters of reference indicate corresponding parts.

C represents the cooking-cylinder, which is arranged longitudinally inside of the steam cylinder or jacket A, with a steam-space between them. The ends of the cooking-cylinder project through the heads of the outer cylinder, A, and to one of the protruding ends is connected the feed-hopper H, and to the opposite end is attached the discharge-spout D. A spiral conveyer, I, is extended longitudinally through the inner or cooking cylinder, C, to force the substance to be cooked from the feed end to the discharge end of said cylinder in the usual and well-known manner.

The steam surrounding the inner cylinder, C, heats the same, so as to cook the substance in transit therein. Since this cylinder is usually composed of a thin shell and exposed to heat at the inside as well as the outside, it is caused to expand much more than the outer cylinder or jacket, A, the exterior of which is exposed to air. In order to permit such unequal expansion without straining either of said cylinders or their connections, I provide one or both ends of the outer cylinder, A, with a stuffing box or boxes, $b$, through which the end or ends of the inner cylinder extend movably longitudinally.

When miter-gears $c\ c$ are employed for transmitting motion to the vertical shaft $d$ of the discharge-spout, I may employ only the stuffing-box $b$ at the feed end of the cylinder and connect the two cylinders rigidly together at the opposite end, so as to maintain the two miter-gears uniformly in engagement.

The cap on the feed end of the cookingcylinder C has heretofore been rigidly connected to the end of the outer cylinder, A, and said connection was subjected to excessive strain due to the unequal expansion of the two cylinders during the cooking process, as hereinbefore stated. To obviate this strain I now provide the aforesaid end of the inner cylinder, C, with a cap, $e$, which is separate and detached from the outer cylinder, A. Said cap may be either provided with an internally screw-threaded flange, $f$, into which the end of the cylinder is screwed, as shown at the feed end of the machine in Figs. 1 and 2 of the drawings, or the attachment of the cap may be made by outward-projecting flanges on the cap and cylinder and rivets or bolts passing through said flanges in the usual and well-known manner.

Having described my invention, what I claim as new, and desire to secure by Letters Patent, is—

In a cooking apparatus, the concentric cylinders, arranged one within the other, the ends of the inner cylinder projecting through the heads of the outer cylinder, the interposed packed joints at each end of the outer cylinder, and the screw-threaded cap on one end of the inner cylinder, in combination with the screw-shafts and beveled gearing by which the same are operated, whereby the free expansion and contraction of the respective cylinders are provided for, substantially as and for the purpose set forth.

In testimony whereof I have hereunto signed my name, in the presence of two witnesses, at Syracuse, in the county of Onondaga, in the State of New York, this 26th day of March, 1888.

HENRY H. BOGGS. [L. S.]

Witnesses:
  C. H. DUELL,
  C. L. BENDIXON.